B. T. BROOKS.
PROCESS OF MAKING CHLORHYDRINS.
APPLICATION FILED SEPT. 24, 1919.
1,394,664. Patented Oct. 25, 1921.
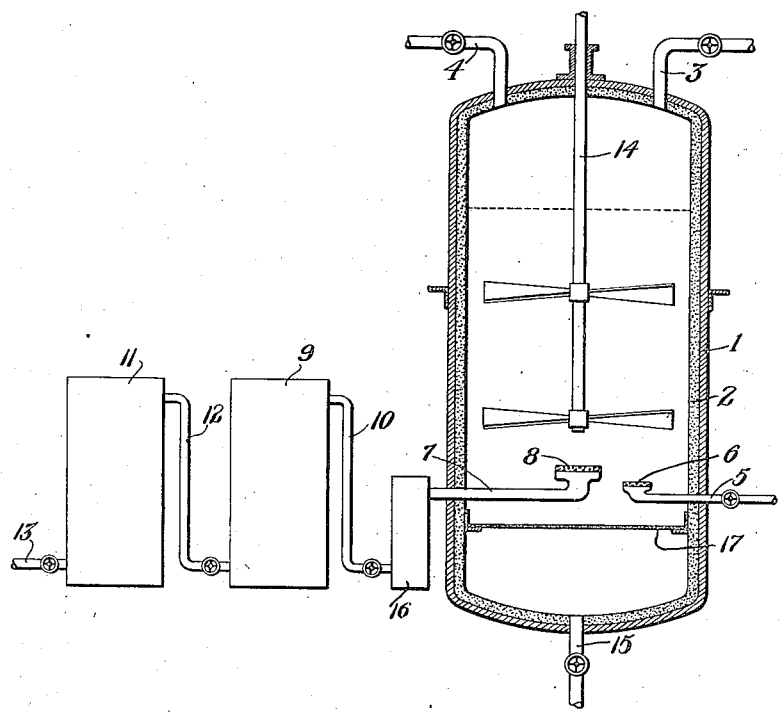
Benjamin T. Brooks, Inventor
By Frederick S. Duncan
Attorney

UNITED STATES PATENT OFFICE.

BENJAMIN T. BROOKS, OF BAYSIDE, NEW YORK, ASSIGNOR TO CHADELOID CHEMICAL COMPANY, A CORPORATION OF WEST VIRGINIA.

PROCESS OF MAKING CHLORHYDRINS.

1,394,664.   Specification of Letters Patent.   Patented Oct. 25, 1921.

Application filed September 24, 1919. Serial No. 325,971.

*To all whom it may concern:*

Be it known that I, BENJAMIN T. BROOKS, a citizen of the United States, and a resident of Bayside, in the county of Queens, Long Island, and State of New York, have invented certain new and useful Improvements in Processes of Making Chlorhydrins, of which the following is a specification.

In making chlorhydrins by the action of hypochlorous acid, upon olefins it is advantageous to operate in such a manner that the chlorhydrins are removed from the reaction mixture as fast as formed, that is to say that the building up of chlorhydrins in this solution is substantially prevented. This is particularly advantageous in the case of chlorhydrins which are acted upon by free chlorin.

Hypochlorous acid is commonly prepared according to well known principles by passing chlorin into water which may or may not contain salts or alkaline material capable of combining with hydrochloric acid. It is well known that solutions of chlorin in water contain relatively large proportions of free chlorin as compared with hypochlorous acid. In order to diminish this ratio in favor of hypochlorous acid it has been attempted to carry out such reactions in the presence of salts capable of combining with the hydrochloric acid which is simultaneously formed when chlorin acts upon water in accordance with the well known system expressed by the following equation:

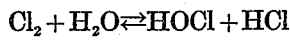

$$Cl_2 + H_2O \rightleftarrows HOCl + HCl$$

In the present invention the chlorhydrins are protected from the action of chlorin by removing them from the aqueous reaction medium by means of a solvent substantially immiscible in water and which dissolves the chlorhydrins and thus removes them from the aqueous solution.

In one form of the invention a solvent of a volatile nature may be used. Chloroform, carbon tetrachlorid, acetylene tetrachlorid, dichlorethane and benzol, toluol and the like may be employed, also volatile petroleum hydrocarbons and ethers and esters of a volatile character. Preferably a solvent is employed which does not take up chlorin readily under the conditions of temperature and pressure involved in carrying out the present reaction. When using volatile solvents it is preferable to employ concentrated ethylene, propylene and the like. With gases containing only a small amount of unsaturated hydrocarbons the passage of the saturated gases through the volatile solvent tends to carry away the latter and make special means for its recovery necessary. By using for example pure ethylene a volatile solvent may be utilized to advantage. But with gases such as obtained from the cracking of petroleum the 80% or more of saturated gases makes the use of a volatile solvent less desirable. A solvent which is substantially non-volatile under the conditions of operation is preferable in the latter case. Among these may be mentioned naphthalene, monochlorid, and liquid chlorinated benzol, toluol, solvent naphtha, etc., also phenol and cresol, especially their chlorinated products. Green scrubbing oil or anthracene oil may be employed in some cases.

While as indicated pure ethylene gas may be employed in some cases it is preferable to use dilute ethylene mixtures such as are found in petroleum still gases. When propylene and higher unsaturated compounds are not desired these may be removed from the still gases by passage through cooled sulfuric acid of a specific gravity 1.8. The residual gases from the sulfuric acid absorption contain ethylene as the principal unsaturated constituent and may be passed into the medium in which the ethylene chlorhydrin is to be formed.

Petroleum still gases contain not only ethylene but also substantial quantities of propylene and butylene and may also contain vapors of the amylenes, hexylenes, etc. Chlorin reacts upon the chlorhydrins of the ethylene homologues very much more readily than upon ethylene chlorhydrin. The manufacture of chlorhydrins according to the present invention is therefore particularly advantageous in the case of petroleum still gases.

Gases from the cracking of petroleum to produce gasolene are especially well suited for use in carrying out the present invention. These gases are a by-product in the oil refinery and are used as a fuel; gases obtained by cracking oil in tubes, retorts or stills and cracking with or without pressure and with or without the addition of water or other agents may be used, as the gases obtained from all such operations will carry a considerable percentage of the unsaturated gases desired. The gas from the stills used in carrying out the Burton process may be used advantageously, also gases obtained by distilling the initial Burton distillate, in other words those gases obtained by re-running crude Burton distillate. Gases of this character will usually carry between 10 and 20% of unsaturated hydrocarbons in which ethylene and propylene predominate.

The homologues of ethylene are very much more less soluble in water than ethylene. But in the practice of the present invention the organic solvent serves the purpose of quickly and efficiently removing these olefins from the still gases even though their concentration in the gas may be quite small.

It is thus apparent that the efficient utilization of the olefins of petroleum still gases presents a number of difficulties which are unique and characteristic of these still gases.

In order continuously to remove the chlorhydrins from the aqueous reaction mixture it is advisable to continually add to the reaction mixture fresh solvent and to remove continuously a portion of this solvent as otherwise the concentration of chlorhydrin might gradually increase in both the solvent and aqueous phases of the reaction mixture. In practice the solvent is continuously removed from the reaction mixture directly to an apparatus in which the solvent is distilled from the chlorhydrin and the recovered pure solvent returned to the chlorhydrin reaction mixture. The same result may be less efficiently carried out by extracting the solvent containing chlorhydrin with a large volume of water.

In practising the present invention when using a highly volatile solvent carbon tetrachlorid or ethylene chlorid is preferred as the solvent but any solvent which is not readily acted upon by chlorin in the cold and in the dark may be employed. As a relatively non-volatile solvent paraffin oil or monochlornaphthalene or mixtures of these may be used.

The removal of chlorhydrins from the aqueous reaction medium by the solvent is rendered more efficient if a soluble salt is added to the aqueous reaction medium which diminishes the solubility of the chlorhydrins in this aqueous solution.

The presence of a small amount of chlorhydrin in the aqueous medium at the start of the operation is desirable to facilitate the reaction in its initial stages and it is hence preferable to add already prepared chlorhydrin to the medium to cause it to contain a fraction of a per cent. or so of chlorhydrin. Preferably such an amount of chlorhydrin is added as will produce in the emulsion of oil and aqueous medium the requisite content of chlorhydrin that is normally present when the process is in full operation. So that there is practically no change in the chlorhydrin content of the aqueous medium from the very start of the operation. The immiscible solvent does not completely remove the chlorhydrin from the aqueous medium there being a division of the chlorhydrin between the two solvents in a manner determined by their relative solvent effects as is expressed by the co-efficient of partition. The presence of hydrochloric acid and salts serves to depress the solubility of the chlorhydrin in the aqueous medium driving more of it into the oil vehicle. While the presence of hydrochloric acid or salts somewhat tends to depress the solubility of ethylene and prophylene in the aqueous medium it is preferable to use such compounds in the medium in order to assist in expelling chlorhydrins from the medium and into the solvent or oil vehicle and to rely upon the presence of the latter to bring into the reaction zone such quantities of unsaturated hydrocarbons as will cause the reaction to take place expeditiously.

A description of the process in one illustrative embodiment is as follows:

A suitable apparatus for carrying out the process is shown in elevation, partly in section, in the accompanying drawing. A closed reaction vessel consisting of the shell 1 and the lead lining 2 is provided with the necessary inlets and outlets which comprise the inlet 5 for the introduction of chlorin, the inlet terminating in a perforated nozzle 6, an inlet 7 terminating in the porous diaphragm 8 for the introduction of the olefinic gases, a charging inlet 3 for liquids and a gas outlet 4. Another outlet 15 should also be provided for discharging liquors. The use of porous nozzles promotes the solution of the olefins present in the still gases in the reaction mixture and this solution may be still further promoted by vigorous agitation by means of the agitator 14 operated by any suitable power. When, however, a heavy solvent such as carbon tetrachlorid is employed, it is preferable to insert a perforated plate 17 near the bottom of the vessel in order that the extreme lower portion of the solution may not be as vigorously agitated as the upper portion, the purpose being to permit the solvent to collect whereby it may be readily drawn off through the outlet 15. Before reaching the vessel, the olefinic gas is preferably introduced into a scrubbing chamber 11 from a source of supply 13, thence through the pipe 12 to the purifier 9, thence through the pipe 12 to the cooler 16, whence it passes through the pipe 17 and through the nozzle 8 as above described.

In order to accelerate the process the still gases are introduced into the apparatus under a pressure of five to ten atmospheres but this is not essential, it merely hastens the process probably through effecting more rapid solution of the olefins in the reaction mixture. It is preferable to use common salt in the aqueous reaction mixture on account of its cheapness and relatively high solubility in cold water, although other inert salts such as calcium chlorid, sodium sulfate and the like may be employed. A mixture of sodium sulfate and chlorid may be used. Salt solutions ranging from 2 or 3% and upward to 10% or even saturation may be utilized. The hydrochloric acid formed may be progressively neutralized if desired to increase the degree of salinity.

Preferably free chlorin or chlorin water and not salts of hypochlorous acid are used in carrying out the present invention but in some cases alkaline solutions may be employed for absorption of the chlorin in the presence of the unsaturated hydrocarbon. In this case it is best to use carbonate or bicarbonate of soda rather than caustic soda for such solutions. To these may be added common salt or sulfate of soda.

In the preferred form chlorin is passed into approximately a 5% solution of common salt with no alkali present. A volume of an immiscible solvent is present which is preferably by volume two to five times greater than the volume of the aqueous medium. Enough chlorhydrin is added to raise the concentration of the aqueous medium to that normal for regular running conditions. A temperature between 10 and 20° C. is preferably employed and as stated the pressure is preferably superatmospheric. The solvent is fed in at the top of the treating chamber preferably in a slow stream and is removed at the same rate in the lower part of the chamber through the false bottom mentioned. The mixture is violently agitated to produce an emulsion. The solvent vehicle serves both to dissolve unsaturated hydrocarbons and chlorhydrins which are formed in excess of the amount the aqueous medium will take up. The petroleum still gas is introduced, in the lower part of the receptacle, preferably just above the false bottom. The gas may be cooled before introduction and may be washed or scrubbed to remove condensable oils which might interfere with the action of the solvent. It may be otherwise purified if desired as by removal of hydrogen sulfid. Gas with 80% or more of inert hydrocarbons prevents localization of the reaction or any violent local heating, etc. hence the gases from petroleum stills are useful in securing a uniformity of reaction and of product. The aqueous medium may be withdrawn from time to time and the hydrochloric acid extracted. The operation may be carried on continuously or intermittently throughout according to circumstances.

Preferably the aqueous medium is maintained in an acid condition due to the presence of hydrochloric acid during the entire course of the process. The proportion of chlorin which is introduced with respect to the still gases is based on the composition of the latter, approximately just sufficient chlorin being introduced in a uniform current as will suffice to carry out the reaction of producing chlorhydrins and the accompanying hydrochloric acid.

What I claim is:—

1. The process of making chlorhydrins which comprises passing chlorin and petroleum still gases into an emulsion of a solvent immiscible in water and an aqueous saline extraction medium, the chlorin and still gas being introduced in approximately equivalent quantities to form chlorhydrins and hydrochloric acid, in removing the oil charged with chlorhydrins from the field of reaction prior to chlorination of such chlorhydrins and in separating the chlorhydrin material from the solvent vehicle.

2. In the manufacture of chlorhydrins from olefin gases the steps which comprise leading said olefin gases into an emulsion of aqueous material and solvent material immiscible in water in the presence of chlorin gas whereby chlorhydrins are formed and are dissolved in the immiscible solvent vehicle and in removing the latter with accompanying chlorhydrins from the aqueous material whereby the concentration of chlorhydrins in the aqueous medium remains approximately constant.

BENJAMIN T. BROOKS.